G. E. CASSEL.
POWER TRANSMISSION DEVICE.
APPLICATION FILED NOV. 12, 1917.

1,261,211.

Patented Apr. 2, 1918.
2 SHEETS—SHEET 1.

Inventor
Gunnar Elias Cassel,
By _____
Atty.

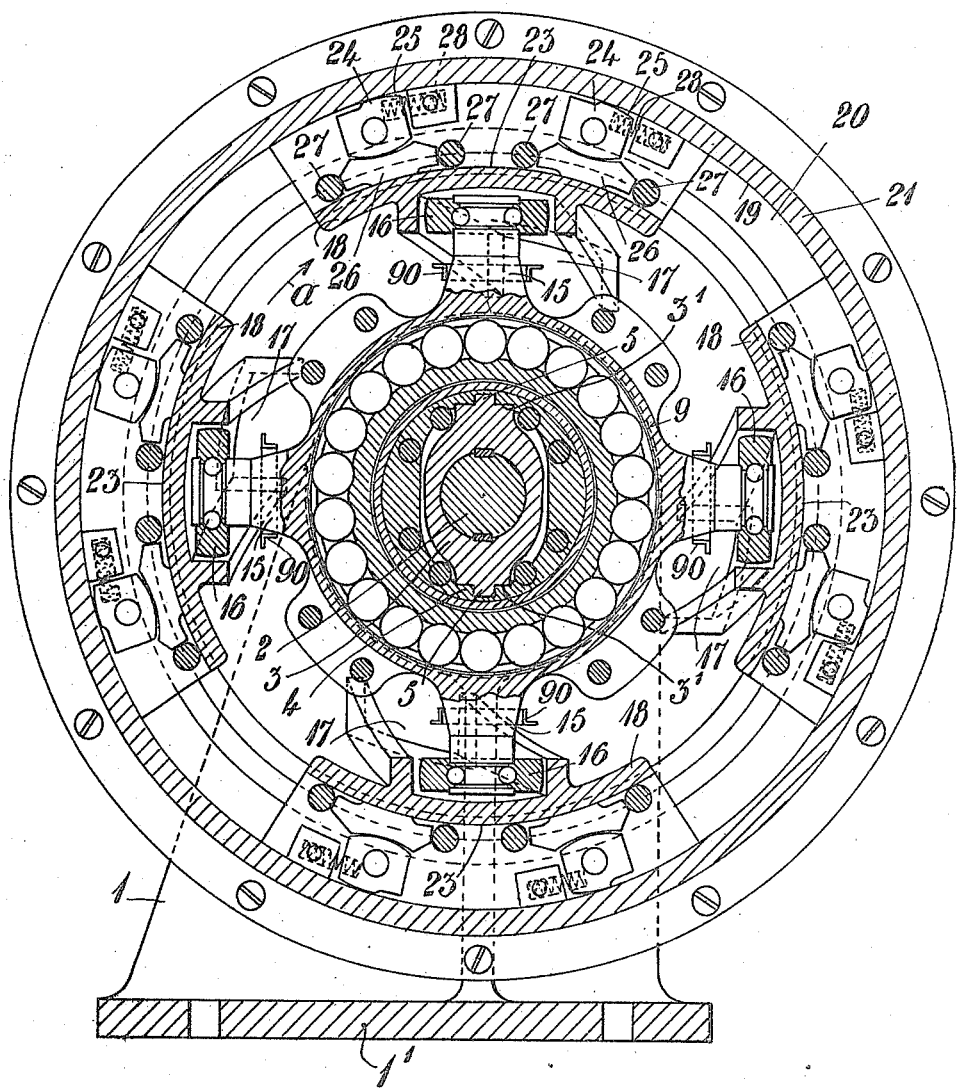

UNITED STATES PATENT OFFICE.

GUNNAR ELIAS CASSEL, OF STOCKHOLM, SWEDEN, ASSIGNOR TO ARTUR LORENZ OLOF ABRAHAM LEFFLER, OF DJURSHOLM, SWEDEN.

POWER-TRANSMISSION DEVICE.

1,261,211.     Specification of Letters Patent.     Patented Apr. 2, 1918.

Application filed November 12, 1917. Serial No. 201,622.

*To all whom it may concern:*

Be it known that I, GUNNAR ELIAS CASSEL, a citizen of the Kingdom of Sweden, residing at Stockholm, Sweden, have invented new and useful Improvements in Power-Transmission Devices, of which the following is a specification.

This invention relates to variable-speed power-transmission devices of the kind including a non-rotary thrust-disk mounted on a driving shaft and operating a clutch mechanism on the driven shaft, said disk being adjustable in different inclined positions with respect to the driving shaft for the purpose of varying the ratio of gearing of the device.

Heretofore, the transmission of the power from the said thrust-disk to the clutch mechanism has been effected by a number of rods connecting different points of the periphery of the said disk with the different clutch members of the clutch mechanism.

The use of such power-transmission devices, as heretofore constructed, however, is very limited as the driving shaft and the driven shaft must be at right angles to each other.

The object of this invention is to provide an improved variable-speed power-transmission device of the said kind which may be used for the transmission of power between shafts lying in alinement with each other.

To this end the invention consists of the novel features and combinations of devices hereinafter described, and defined in the claims.

An embodiment of the invention is illustrated in the accompanying drawings.

Figure 1:
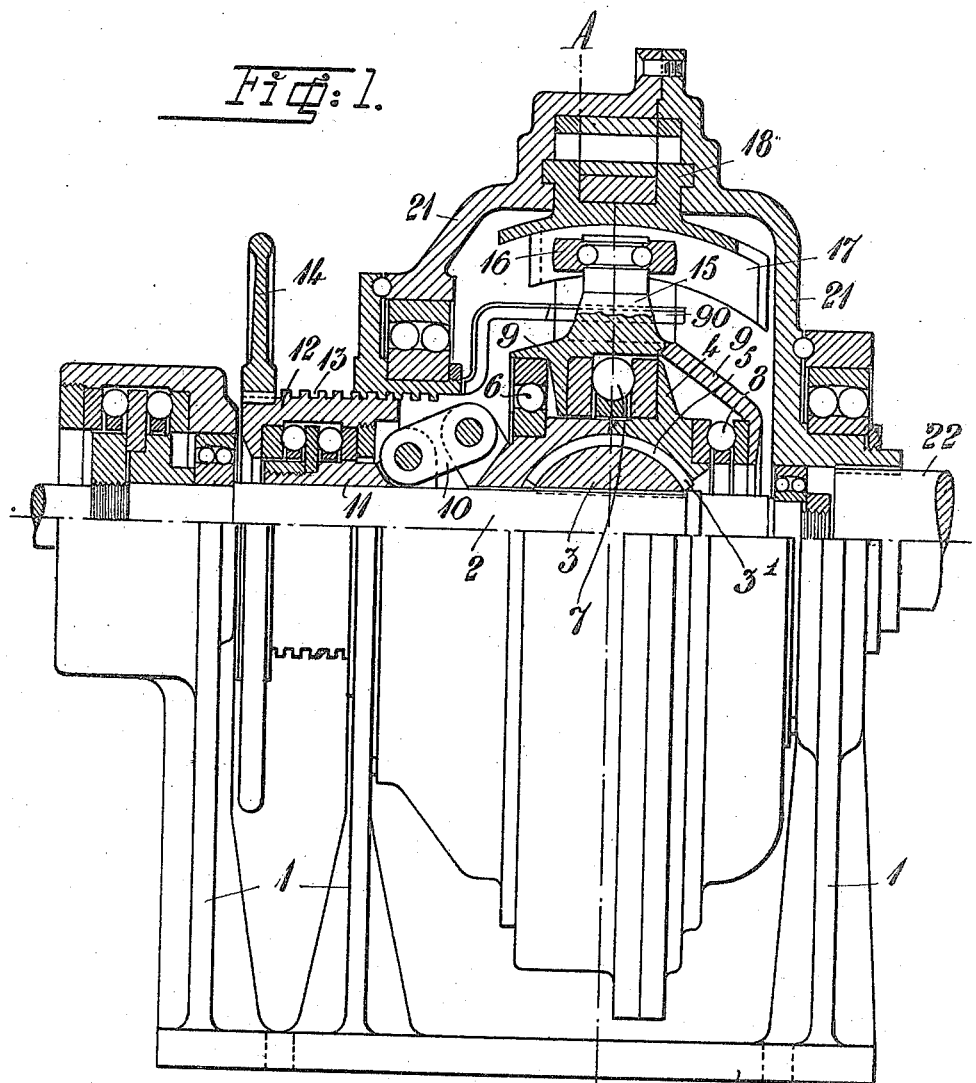
Figure 3:
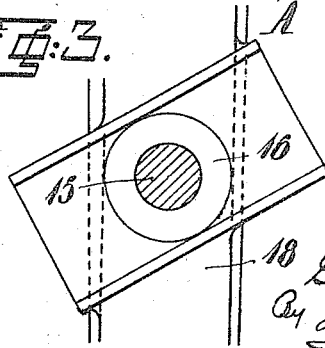

Figure 1 is a side elevation of a power-transmission device constructed in accordance with this invention. Fig. 2 is a cross-sectional elevation on the line A—A of Fig. 1. Fig. 3 is a detail view.

Referring to the drawings, $1^1$ indicates a bed plate which, as shown, carries a number of bearing-pedestals 1. A driving shaft 2 is journaled in the pedestals and is fixed against endwise movement therein. A driven shaft 22 is mounted in the right pedestal 1, its mounting in the said pedestal being indirect, as will hereinafter appear. Keyed to the driving shaft 2 is a member 3 formed with two outer bearing surfaces $3^1$ at opposite sides of the shaft 2, said bearing surfaces forming part of a cylinder the axis of which is at right angles to the axis of the shaft 2. A disk 4 is mounted on the said bearing surfaces $3^1$ of the member 3 said disk, preferably, consisting of several parts connected to each other by means of bolts or the like. This disk 4 is connected to the member 3 for rotation therewith by means of peripheral flanges 5 extending from the surfaces $3^1$ and engaging corresponding grooves of the disk 4. The said flanges 5 cause the disk 4 to rotate with the member 3 and the driving shaft 2, while at the same time permitting the disk to be turned to a more or less oblique position in relation to the shaft 2. Another disk 9 which, as shown, is preferably made in several pieces is loosely mounted on the disk 4 by means of ball bearings 6, 7 and 8, said ball bearings being so arranged as to permit the outer disk 9 to wabble under the action of the disk 4.

To adjust the rotary disk 4 in a more or less oblique position in relation to the driving shaft 2 or to maintain the same in a plane at right angles to said shaft, a hub 11 is slidably mounted on the driving shaft 2, said hub being, as shown, connected to the disk 4 by means of a link 10. The hub 11 forms the rotary part of a thrust ball bearing the non-rotary part 12 of which being, as shown, formed with screw-threads 13 on its outer surface engaging stationary screw-threads formed in the middle pedestal 1. A hand-wheel 14, which, as shown, is keyed to the ring 12 affords means whereby the said ring 12 may be screwed into or out of the said stationary screw-threads, thus causing the whole thrust ball bearing to move axially on the shaft and adjust the rotary disk 4 on the member 3.

The wabbling disk 9 is provided with a suitable number of symmetrically placed, radial projections 15, each of which, as shown, carries a roller 16 mounted by means of ball bearings. Forks 90, extending axially from the middle pedestal 1, embrace the projections 15 to prevent rotation of the disk 9, but permit the same to vibrate back and forth under the action of the disk 4. As shown, there are four rollers 16, each of said rollers engaging an oblique slot 17 formed in an annular segment 18. The four segments 18 are slidably mounted in an annular guide 20 formed in the interior surface of a cylindrical drum 21, the bottom 19 of said guide being concentric with the shaft 2. The cylindrical drum 21 is journaled in the pedestals 1 by means of ball bearings, and is rigidly connected with the driven shaft 22.

The segments 18 are U-shaped in cross-section and provided with a surface 23 concentric to the cylindrical bottom 19 of the guide 20 and situated at a certain distance therefrom. Situated in the space between the surfaces 19 and 23 in each segment are two friction pawls 24 bearing against the surface 19 with curved contact surfaces 25 the radius of curvature of which is greater than half the distance between the surfaces 19 and 23. On the other hand convex surfaces of said friction pawls engage curved recesses of shoes 26 loosely mounted on the surface 23 of the segment between suitable stoppers 27 which permit a slight movement of the shoes in relation to the segment to facilitate the rolling movement of the friction pawls. The radius of curvature of the recesses of the shoes 26 is somewhat greater than the radius of curvature of the surfaces of the friction pawls coöperating therewith, in order that the latter may be able to perform a partial rolling movement on said shoes. The friction pawls 24 are acted upon by springs 28 tending to keep the pawls in operative connection with the surface 19. The friction surface of the pawls coöperating with the surface 19 is so formed that the pawls may be firmly clamped between the surface 19 and the corresponding shoe 26 by rolling in one direction, and may be released by rolling in the opposite direction.

The device described operates as follows: When the parts of the power-transmission device are adjusted into the position shown in Fig. 2, in which the disk 4 is in a position at right angles to the shaft 2, no movement will be imparted to the non-rotary disk 9. When the thrust bearing 11, 12 is moved axially toward the disk 4, by turning the hand-wheel 14, the disk 4 will be turned to an oblique position in relation to the axis of the shaft 2, and on account thereof the rotation of the disk 4 with the driving shaft will cause the non-rotary disk 9 to vibrate back and forth in a gyratoric movement in which one projection 15 with its roller 16 after the other will successively move between extreme positions in the longitudinal direction of the shaft 2. Owing to the engagement of said rollers 16 into the oblique slots 17 of the segments 18 the latter will be caused to successively move to and fro in the guide 20. When the segments 18 move in the direction indicated by the arrow a (see Fig. 2) the friction pawls 24 will by rolling on the surface 19 be firmly clamped between said surface and the corresponding shoes 26 thereby causing the casing 21 to move with the segments. When the segments move in the opposite direction the friction pawls will roll so as to come out of engagement with the surface 19 and may freely slide thereon without imparting any movement whatever to the casing 21. As soon as the segments 18 again move in the direction indicated by the arrow a the spring 28 will throw the friction pawls into operative positions, whereupon the pawls will be firmly clamped between the surface 19 and the shoes 26 by rolling thereon, as already described.

By the provision, in the manner described, of four projections on the driving disk, which projections receive their maximum speed of travel in succession a uniform and even rotary movement will be imparted to the casing 21 and the driven shaft 22, the particular projection which is moving in the right direction and with the greatest speed being the one which at the particular instant is driving the casing, while the following projection will receive its maximum speed and drive the casing before the speed of the foregoing projection is reduced appreciably.

It is obvious that the speed of the movement given to the casing 21 and the shaft 22 in relation to that of the driving shaft 2 depends on the angle at which the disk 4 is set with respect to the axis of the shaft 2 and may be changed by axial displacement of the bearing 11, 12 from zero to a maximum speed corresponding to the extreme oblique position of the disk 4 with relation to the shaft 2.

It will be noted that the device may be modified in several respects without departing from the scope and the principle of the invention. For instance, the four annular sliding segments 18 may be substituted by four rings provided with clutch members and mounted side by side within the drum or casing 21. The number of projections 15 of the driving disk as well as the number of annular segments or rings within the driven drum 21 may be chosen at will, though it is advisable for securing uniform rotation not to use less than three such projections.

The power-transmission device, as above described, is provided with clutch members operating for one direction only. It is evident, however, that the mechanism may be made reversible by also providing it with clutch members operating for the opposite direction. In such a case means must be provided to keep one set of clutch members out of action while the other set is in action.

It should be understood that the shaft 22 may be used as driving shaft and the shaft 2 as driven shaft in case it is desired to transform a low speed into a high speed.

What I claim, and desire to secure by Letters Patent is as follows:—

1. A power-transmission device, comprising a driving shaft, an obliquely-acting disk mounted thereon, a non-rotary disk mounted on said first-mentioned disk, radial projections on said non-rotary disk, a driven member, clutch supporting members mounted in said driven member, oblique slots in said clutch supporting members, engaged by said radial projections, substantially as and for the purpose set forth.

2. A power-transmission device, comprising a driving shaft, an obliquely-acting disk mounted thereon, a non-rotary disk, mounted on said first-mentioned disk radial projections on said non-rotary disk, a driven member, clutch supporting members mounted to slide in said driven member concentric to the driving shaft, clutch members mounted in said supporting members to connect the said driven member with the said supporting member, oblique slots in said supporting members engaged by the said radial projections, substantially as and for the purpose set forth.

3. A power-transmission device, comprising a driving shaft, an obliquely-acting disk mounted on said shaft for rotation therewith, another disk loosely mounted on said first-mentioned disk, means for holding said another disk against rotation while permitting the same to wabble, radial projections on said non-rotary disk, a driven member, a guide in said driven member concentric to the driving shaft, a plurality of clutch supporting members, slidably mounted in said guide, clutches mounted in said supporting members and operating on said driven member, oblique slots in said supporting members engaged by said radial projections, substantially as and for the purpose set forth.

4. A power-transmission device, comprising a driving shaft, an obliquely acting disk mounted thereon for rotation therewith, a non-rotary disk, loosely mounted on said first-mentioned disk, radial projections on said non-rotary disk, antifriction rollers on said projections, a driven member, clutch supporting members mounted therein, oblique slots in said supporting members, engaged by the said antifriction rollers, substantially as and for the purpose set forth.

5. A power-transmission device, comprising a driving shaft, an obliquely-acting disk mounted thereon for rotation therewith, means for adjusting said disk, a non-rotary disk, loosely mounted on said first-mentioned disk, radial projections on said non-rotary disk, a driven member, clutch supporting members mounted therein, oblique slots in said supporting members engaged by the said projections, substantially as and for the purpose set forth.

6. A power-transmission device, comprising a driving shaft, an obliquely acting disk, mounted thereon for rotation therewith, means for adjusting said disk, another disk loosely mounted on said first-mentioned disk, means for holding the said last-mentioned disk against rotation while permitting the same to wabble, radial projections on said last-mentioned disk, antifriction rollers on said radial projections, a driven member, a guide in said driven member, concentric with the driving shaft, a plurality of clutch supporting members mounted in said guide to slide therein, clutches provided in said supporting members for the operation of said driven member, obliquely extending slots in said supporting members, engaged by said antifriction rollers, substantially as and for the purpose described.

In testimony whereof I have signed my name.

GUNNAR ELIAS CASSEL.

Copies of this patent may be obtained for five cents each, by addressing the "Commissioner of Patents, Washington, D. C."